United States Patent
Kondo et al.

(10) Patent No.: US 10,042,648 B2
(45) Date of Patent: Aug. 7, 2018

(54) MEMORY SYSTEM, ELECTRIC DEVICE, AND INFORMATION PROCESSING DEVICE

(71) Applicant: Toshiba Memory Corporation, Minato-ku (JP)

(72) Inventors: Nobuhiro Kondo, Yokohama (JP); Kenichi Maeda, Kamakura (JP); Sven Hegner, Dusseldorf (DE)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 111 days.

(21) Appl. No.: 15/011,948

(22) Filed: Feb. 1, 2016

(65) Prior Publication Data
US 2017/0075694 A1  Mar. 16, 2017

Related U.S. Application Data

(60) Provisional application No. 62/216,801, filed on Sep. 10, 2015.

(51) Int. Cl.
| | |
|---|---|
| *G06F 9/00* | (2006.01) |
| *G06F 15/177* | (2006.01) |
| *G06F 9/4401* | (2018.01) |
| *G06F 9/455* | (2018.01) |
| G06F 12/0868 | (2016.01) |
| G06F 3/06 | (2006.01) |
| G06F 12/0846 | (2016.01) |
| G06F 12/0802 | (2016.01) |
| G06F 21/79 | (2013.01) |

(52) U.S. Cl.
CPC ........ *G06F 9/4401* (2013.01); *G06F 9/45508* (2013.01); *G06F 3/0604* (2013.01); *G06F 3/0632* (2013.01); *G06F 12/0802* (2013.01); *G06F 12/0848* (2013.01); *G06F 12/0868* (2013.01); *G06F 21/79* (2013.01); *G06F 2212/304* (2013.01); *G06F 2212/60* (2013.01)

(58) Field of Classification Search
CPC .. G06F 9/4401; G06F 3/0632; G06F 12/0848; G06F 21/79; G06F 3/0604; G06F 12/0802; G06F 2212/60; G06F 12/0868; G06F 2212/304; G06F 9/45508
See application file for complete search history.

(56) References Cited

U.S. PATENT DOCUMENTS

| | | | | |
|---|---|---|---|---|
| 2013/0036260 | A1* | 2/2013 | Kurashige | ........... G06F 12/0868 711/103 |
| 2014/0059273 | A1 | 2/2014 | Fujimoto et al. | |
| 2016/0266803 | A1* | 9/2016 | Funaoka | ............... G06F 3/0604 |

FOREIGN PATENT DOCUMENTS

| | | |
|---|---|---|
| JP | 9-160773 | 6/1997 |
| JP | 5264460 | 8/2013 |
| JP | 2014-44490 | 3/2014 |

* cited by examiner

*Primary Examiner* — Xuxing Chen
(74) *Attorney, Agent, or Firm* — Oblon, McClelland, Maier & Neustadt, L.L.P.

(57) ABSTRACT

A memory system includes a memory and a command generator. The memory is connected to a host including a main memory and a processor connected to the main memory. The command generator generates an initialization command and transmits the initialization command to the host. The initialization command represents a command for instructing the initialization of the main memory and indicating an initialization method for the main memory.

11 Claims, 8 Drawing Sheets

| COMMAND PACKET | | | |
|---|---|---|---|
| 0<br>Opcode: 0h | 1<br>Reserved | 2<br>Reserved | 3<br>Reserved |
| 4 | 5 | 6 | 7 |
| Start address upper | | | |
| 8 | 9 | 10 | 11 |
| Start address lower | | | |
| 12 | 13 | 14 | 15 |
| Length upper | | | |
| 16 | 17 | 18 | 19 |
| Length lower | | | |
| 20<br>Reserved | 21<br>Reserved | 22<br>Reserved | 23<br>Constant |

FIG.8

| COMMAND PACKET | | | |
|---|---|---|---|
| 0<br>Opcode: 1h | 1<br>Pattern Length | 2<br>Reserved | 3<br>Reserved |
| 4 | 5 | 6 | 7 |
| Start address upper | | | |
| 8 | 9 | 10 | 11 |
| Start address lower | | | |
| 12 | 13 | 14 | 15 |
| Length upper | | | |
| 16 | 17 | 18 | 19 |
| Length lower | | | |
| 20 | 21 | 22 | 23 |
| Initial pattern upper | | | |
| 24 | 25 | 26 | 27 |
| Initial pattern lower | | | |

FIG.9

| COMMAND PACKET | | | |
|---|---|---|---|
| 0<br>Opcode: 2h | 1<br>Pattern Length | 2<br>Reserved | 3<br>Reserved |
| 4 | 5 | 6 | 7 |
| | | Start address upper | |
| 8 | 9 | 10 | 11 |
| | | Start address lower | |
| 12 | 13 | 14 | 15 |
| | | Length upper | |
| 16 | 17 | 18 | 19 |
| | | Length lower | |
| 20 | 21 | 22 | 23 |
| | | Initial pattern upper | |
| 24 | 25 | 26 | 27 |
| | | Initial pattern lower | |

FIG.10

| COMMAND PACKET | | | |
|---|---|---|---|
| 0<br>Opcode: 3h | 1<br>Pattern Length | 2<br>Reserved | 3<br>Reserved |
| 4 | 5 | 6 | 7 |
| | | Start address upper | |
| 8 | 9 | 10 | 11 |
| | | Start address lower | |
| 12 | 13 | 14 | 15 |
| | | Length upper | |
| 16 | 17 | 18 | 19 |
| | | Length lower | |
| 20 | 21 | 22 | 23 |
| | | Initial pattern upper | |
| 24 | 25 | 26 | 27 |
| | | Initial pattern lower | |
| 28 | 29 | 30 | 31 |
| | | Adder upper | |
| 32 | 33 | 34 | 35 |
| | | Adder lower | |

FIG.11

| COMMAND PACKET ||||
|---|---|---|---|
| 0 Opcode: 4h | 1 Pattern Length | 2 Shift Direction | 3 Reserved |
| 4 | 5 | 6 | 7 |
| Start address upper ||||
| 8 | 9 | 10 | 11 |
| Start address lower ||||
| 12 | 13 | 14 | 15 |
| Length upper ||||
| 16 | 17 | 18 | 19 |
| Length lower ||||
| 20 | 21 | 22 | 23 |
| Initial pattern upper ||||
| 24 | 25 | 26 | 27 |
| Initial pattern lower ||||
| 28 Shift Number | 29 Reserved | 30 Reserved | 31 Reserved |

FIG.12

| COMMAND PACKET ||||
|---|---|---|---|
| 0 Opcode: 5h | 1 Pattern Length | 2 Reserved | 3 Reserved |
| 4 | 5 | 6 | 7 |
| Start address upper ||||
| 8 | 9 | 10 | 11 |
| Start address lower ||||
| 12 | 13 | 14 | 15 |
| Length upper ||||
| 16 | 17 | 18 | 19 |
| Length lower ||||
| 20 | 21 | 22 | 23 |
| Initial pattern upper ||||
| 24 | 25 | 26 | 27 |
| Initial pattern lower ||||
| 28 | 29 | 30 | 31 |
| Algorithm base address upper ||||
| 32 | 33 | 34 | 35 |
| Algorithm base address lower ||||
| 36 | 37 | 38 | 39 |
| Algorithm length ||||

FIG.13

| COMMAND PACKET ||||
|---|---|---|---|
| 0<br>Opcode: 6h | 1<br>Pattern Length | 2<br>Repetition | 3<br>Number of pattern |
| 4 | 5 | 6 | 7 |
| Start address upper ||||
| 8 | 9 | 10 | 11 |
| Start address lower ||||
| 12 | 13 | 14 | 15 |
| Length upper ||||
| 16 | 17 | 18 | 19 |
| Length lower ||||
| 20 | 21 | 22 | 23 |
| Pattern 1 upper ||||
| 24 | 25 | 26 | 27 |
| Pattern 1 lower ||||
| 28 | 29 | 30 | 31 |
| Pattern 2 upper ||||
| 32 | 33 | 34 | 35 |
| Pattern 2 lower ||||
| ... | ... | ... | ... |
| k | k+1 | k+2 | k+3 |
| Pattern n upper ||||
| K+5 | K+6 | K+7 | K+8 |
| Pattern n lower |||| ize
MEMORY SYSTEM, ELECTRIC DEVICE, AND INFORMATION PROCESSING DEVICE

CROSSREFERENCE TO RELATED APPLICATION

This application is based upon and claims the benefit of priority from the U.S. provisional Patent Application No. 62/216,801, filed on Sep. 10, 2015; the entire contents of which are incorporated herein by reference.

FIELD

Embodiments described herein relate generally to a memory system, an electric device, and an information processing device.

BACKGROUND

In recent years, an information processing device has been disclosed which includes an electric device, such as a host, having a processor and a memory system having a memory from/to which data is read or written by the electric device. In addition, a technique known as a unified memory has been disclosed, in which a memory system uses a portion of a main memory of an electric device. The memory system initializes a part of the area of the main memory of the electric device, if necessary.

In such a technique, the memory system transmits initialization data to be written in order to initialize the main memory. Therefore, a large amount of data needs to be transmitted for initialization.

DETAILED DESCRIPTION

According to an embodiment, a memory system including a memory and a command generator is provided. The memory is connected to a host including a main memory and a processor connected to the main memory. The command generator generates an initialization command and transmits the initialization command to the host. The initialization command represents a command for instructing the initialization of the main memory and indicating an initialization method for the main memory.

Hereinafter, a memory system, an electric device, and an information processing device according to an embodiment will be described in detail with reference to the drawings. In the following description, components having substantially the same functions and structures are denoted by the same reference numerals. In addition, each of the following embodiments will illustrate a device or a method for embodying the technical idea of the embodiment and the technical idea of the embodiment should not be limited to, for example, the materials, shapes, structures, and arrangements of the components described below. Various modifications and changes in the technical idea of the embodiment can be made without departing from the scope of the claims.

Embodiment

Figure 1:
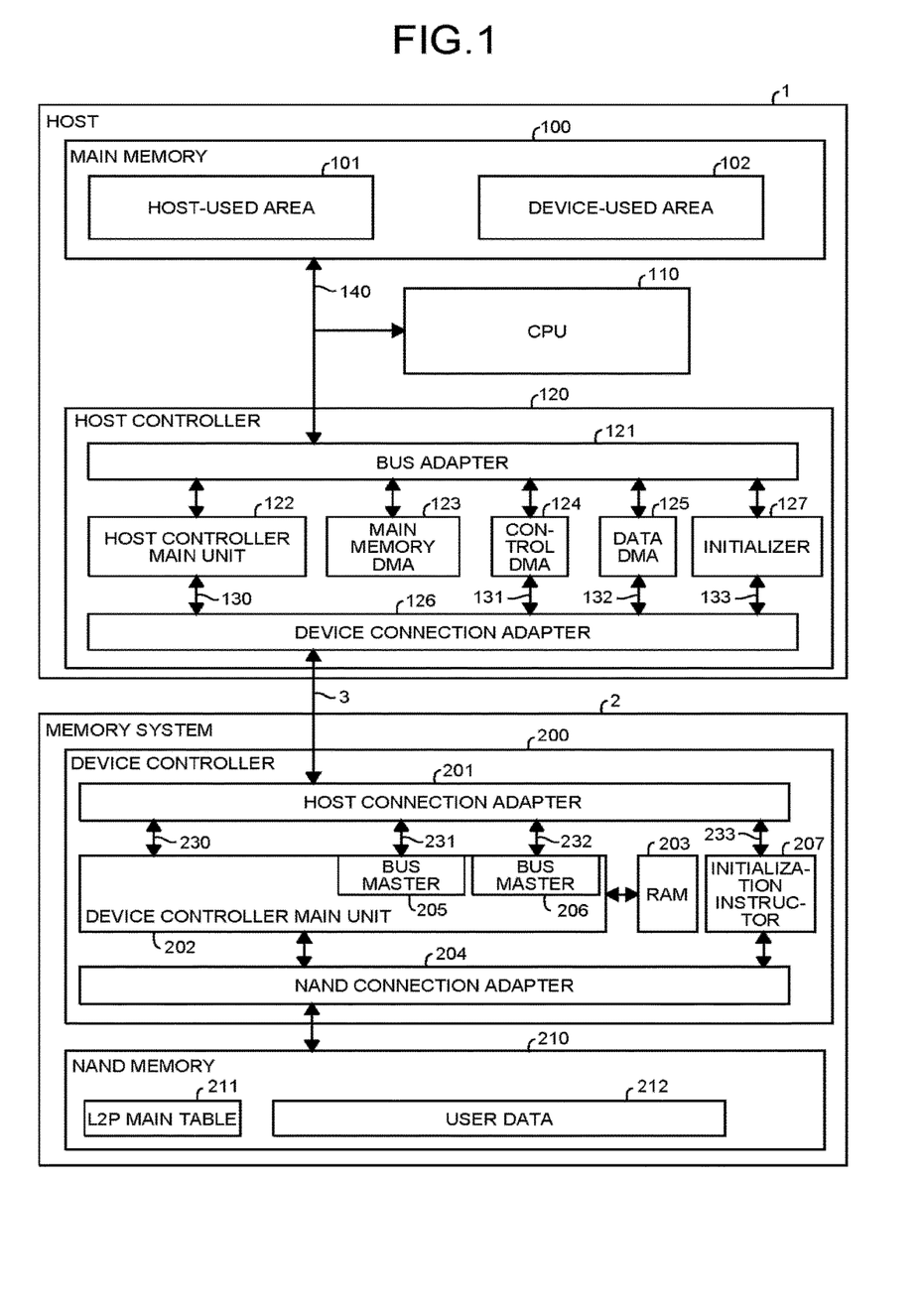
FIG. 1 is a diagram illustrating an example of the structure of an information processing device according to an embodiment.

FIG. 1 is a diagram illustrating an example of the structure of an information processing device according to an embodiment. The information processing device according to the embodiment initializes an arbitrary area of a main memory 100 as a unified memory (UM) of a host 1, in response to an instruction from a memory system 2, for example, in a universal flash storage (UFS) unified memory extension (UME). In this way, the information processing device initializes the area with high efficiency while reducing the amount of data transmitted. Herein, the initialization of the main memory 100 refers to, for example, a processing for making an area of the main memory 100 available so as to write new data to the main memory by writing later-described initialization data to the area in question. The information processing device includes the host 1 and the memory system 2 which functions as an external storage device of the host 1. The host 1 and the memory system 2 are connected via a communication path 3.

The information processing device is, for example, a personal computer, a mobile phone, or an imaging device. The memory system 2 and the communication path 3 can comply with arbitrary standards. For example, the memory system 2 is a flash memory based on a UFS standard. For example, mobile industry processor interface (MIPI) M-PHY is adopted as the communication standard of the communication path 3.

The memory system 2 includes a NAND flash memory (NAND memory) 210 which is a non-volatile memory and a device controller 200 which performs data transfer between the NAND memory 210 and the host 1. Various types of non-volatile memories other than the NAND flash memory can be used for the memory system 2. For example, a magnetoresistive random access memory (MRAM) or a resistance random access memory (ReRAM) can be used.

The NAND memory 210 includes one or more memory chips each having a memory cell array. The memory cell array includes a plurality of memory cells arranged in a matrix. Each memory cell array includes a plurality of blocks. Each block is the unit of data erasing. In addition, each block includes a plurality of pages. Each page is the unit of data write and read. The NAND memory 210 is connected to the host 1 through the device controller 200.

The NAND memory 210 stores an L2P table 211 and user data 212 which is transmitted from the host 1. The user data 212 includes, for example, an operating system program (OS) which provides an execution environment of the host 1, a user program executed by the host 1 on the OS, or data input and output by the OS or the user program.

The L2P table 211 is one item of management information required for the memory system 2 to function as the external storage device of the host 1. The L2P table 211 is address conversion information representing a logical block address (LBA) used by the host 1 to access the memory system 2 and a physical address (a block address+a page address+a storage position in a page) in the NAND memory 210 associated with each other. A portion of the L2P table 211 is temporarily stored, that is, cached in an L2P cache area 300 which will be described below. Hereinafter, the L2P table 211 stored in the NAND memory 210 is referred to as an L2P main table 211 so as to be distinguished from content cached in the L2P cache area 300.

The device controller 200 includes a host connection adapter 201 as a connection interface with the communication path 3, a NAND connection adapter 204 as a connection interface with the NAND memory 210, a device controller main unit 202 which controls the device controller 200, a RAM 203, and an initialization instructor 207.

The RAM 203 is used as a buffer for data transfer between the NAND memory 210 and the host 1. In addition, the RAM 203 is a command queue which queues commands received from the host 1. Each command from the host 1 includes unique identification information. When a plurality of commands are transmitted and received between the host 1 and the memory system 2, each of the commands is specified by identification information.

The device controller main unit 202 controls data transfer between the host 1 and the RAM 203 through the host connection adapter 201 and controls data transfer between the RAM 203 and the NAND memory 210 through the NAND connection adapter 204. The device controller main unit 202 functions as a bus master in the communication path 3 to the host 1 and performs data transfer via a first port 230. In addition, the device controller main unit 202 further includes two bus masters 205 and 206. The bus master 205 can transfer data to the host 1 via a second port 231 and the bus master 206 can transfer data to the host 1 via a third port 232.

The device controller main unit 202 is, for example, a microcomputer unit including a processor and a storage device. The processor executes firmware pre-stored in the storage device to implement the functions of the device controller main unit 202. In addition, the device controller main unit 202 can include an ASIC.

The initialization instructor 207 instructs the initialization of the main memory 100. An example of the area of the main memory 100 to be initialized is a device-used area 102 which will be described below. For example, the initialization instructor 207 generates an initialization command and transmits the initialization command to a host controller 120. The initialization instructor 207 is connected to the NAND memory 210 through the NAND connection adapter 204. In addition, the initialization instructor 207 is connected to the host connection adapter 201 through a fourth port 233. The initialization instructor 207 is connected to the host 1 through the host connection adapter 201 and the communication path 3. The initialization instructor 207 can be provided in the device controller main unit 202.

The host 1 includes a CPU 110 that executes the OS and the user program, the main memory 100, and the host controller 120. The CPU 110 is an example of the processor. The main memory 100, the CPU 110, and the host controller 120 are connected to each other by a bus 140.

The main memory 100 includes, for example, a DRAM. For example, a magnetoresistive random access memory (MRAM) or a ferroelectric random access memory (FeRAM) can be used as the main memory 100. The main memory 100 includes a host-used area 101 (second memory area) and a device-used area 102 (first memory area). The host-used area 101 is used as a program development area by the host 1 to execute a program (the OS and the user program) and a work area which is used by the host 1 to execute the program developed in the program development area. The device-used area 102 is a memory area used by the memory system 2. The device-used area 102 is used as an area that stores, for example, the L2P cache area 300, an L2P cache tag area 310, a data cache area 400, and a data cache tag area 410, which will be described below. For example, the device-used area 102 is allocated to a fixed memory area of the main memory 100.

Figure 2:
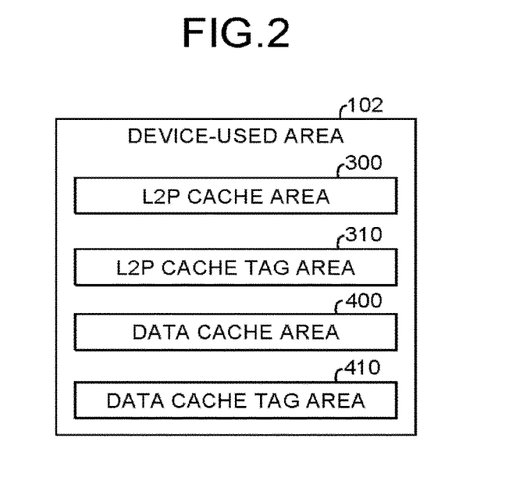
FIG. 2 is a diagram illustrating the memory structure of a device-used area.

FIG. 2 is a diagram illustrating the memory structure of the device-used area 102. As illustrated in FIG. 2, the L2P cache area 300, the L2P cache tag area 310, the data cache area 400, and the data cache tag area 410 are ensured in the device-used area 102. A portion of the L2P main table 211 is cached in the L2P cache area 300. The L2P cache tag area 310 stores tag information used to determine hit or miss of the L2P cache area 300. The data cache area 400 is a memory area with a cache structure in which user data 212 is buffered. The data cache tag area 410 stores information used to determine hit or miss of the data cache area 400. The L2P cache tag area 310 and the data cache tag area 410 contain control information including a valid buffer (VB) bit and a dirty buffer (DB) bit. The VB bit indicates whether a cache line is valid. The DB bit indicates whether the cache line is dirty or clean.

Returning to FIG. 1, the host controller 120 includes a bus adapter 121, a device connection adapter 126, and a host controller main unit 122. The bus adapter 121 is a connection interface with the bus 140. The device connection adapter 126 is a connection interface with the communication path 3. The host controller main unit 122 is connected to the device connection adapter 126 through a first port 130. The host controller main unit 122 can transmit data or commands to the main memory 100 or the CPU 110 through the bus adapter 121 or can transmit data to the memory system 2 through the device connection adapter 126 and the first port 130.

In addition, the host controller 120 includes a main memory direct memory access (DMA) 123, a control DMA 124, and a data DMA 125. The main memory DMA 123 performs DMA transfer between the host-used area 101 and the device-used area 102. The control DMA 124 is connected to the device connection adapter 126 through a second port 131. The control DMA 124 captures a command transmitted from the memory system 2 and transfers the command to the host controller main unit 122 or the main memory DMA 123, or the host controller main unit 122 transfers status information on the device-used area 102 to the memory system 2. The data DMA 125 is connected to the device connection adapter 126 through a third port 132. The data DMA 125 performs DMA transfer between the device-used area 102 and the memory system 2.

The host controller 120 further includes an initializer 127. When receiving an initialization command from the initialization instructor 207, the initializer 127 initializes the main memory 100. The initializer 127 is connected to the main memory 100 through the bus adapter 121 and the bus 140. In addition, the initializer 127 is connected to the device connection adapter 126 through a fourth port 133. The initializer 127 is connected to the memory system 2 through the device connection adapter 126 and the communication path 3. However, the initializer 127 can be provided in any one of the host controller main unit 122, the main memory DMA 123, the control DMA 124, and the data DMA 125.

The first port 130, the second port 131, the third port 132, and the fourth port 133 are associated with the first port 230, the second port 231, the third port 232, and the fourth port 233, respectively, by the functions of the device connection adapter 126 and the host connection adapter 201. Specifically, the host connection adapter 201 transmits content transmitted to the memory system 2 through the first port 130 to the device controller main unit 202 through the first port 230, transmits content transmitted to the memory system 2 through the second port 131 to the device controller main unit 202 through the second port 231, transmits content transmitted to the memory system 2 through the third port 132 to the device controller main unit 202 through the third port 232, and transmits content transmitted to the memory system 2 through the fourth port 133 to the initialization instructor 207 through the fourth port 233. In addition, the device connection adapter 126 transmits content transmitted to the host 1 through the first port 230 to the controller main unit 122 through the first port 130, transmits content transmitted to the host 1 through the second port 231 to the control DMA 124 through the second port 131, transmits content transmitted to the host 1 through the third port 232 to the data DMA 125 through the third port 132, and transmits content transmitted to the host 1 through the fourth port 233 to the initializer 127 through the fourth port 133. The content transmitted to the control DMA 124 and the data DMA 125 is transmitted to the host controller main unit 122 through, for example, the bus adapter 121.

Each of the first to fourth ports 130 to 133 independently has an input/output buffer used for communication with the memory system 2. The host controller main unit 122, the control DMA 124, the data DMA 125, and the initializer 127 are connected to the memory system 2 via their respective input/output buffers. Therefore, the host controller 120 can independently communicate with the memory system 2 via the host controller main unit 122, the control DMA 124, the data DMA 125, and the initializer 127. In addition, the host controller 120 is able to switch the above communication without replacing the input/output buffers, and thus to switch the communication at a high speed. This holds true for the first to fourth ports 230 to 233 of the memory system 2. In a structure in which the initialization instructor 207 is provided in the device controller main unit 202, the initialization instructor 207 can be connected to the host connection adapter 201 through any one of the first to third ports 230 to 232 and the fourth port 233 may be omissible. Similarly, when the initializer 127 is provided in any one of the host controller main unit 122, the main memory DMA 123, the control DMA 124, and the data DMA 125, the initializer 127 can communicate with the device connection adapter via the first to third ports 130 to 132 connected with their modules and the fourth port 133 may be omissible.

The CPU 110 can generate user data in the host-used area 101, controlled by the program in execution. When the CPU 110 issues a write command, the device controller main unit 202 receives the write command and instructs the copy of the user data to be written from the host-used area 101 to the data cache area 400 of the device-used area 102. That is, the user data to be written is stored in the data cache area 400. The user data to be written is transferred from the data cache area 400 to the memory system 2 at a certain timing and s then stored as the user data 212 in a non-volatile memory of the NAND memory 210. The operation for transferring the user data from the data cache area 400 to the NAND memory 210 is referred to as a write-back operation.

In addition, the CPU 110 can read the user data required by the program in execution to the host-used area 101. When reading the user data, the CPU 110 issues a read command (first read command) to read the user data 212 to the host-used area 101. At the instance at which the first read command is issued, the user data to be read may be stored or may not be stored in the data cache area 400. In the first embodiment, when the user data to be read is stored in the data cache area 400, the user data to be read is stored from the data cache area 400 to the host-used area 101 by an instruction from the device controller main unit 202. When the user data to be read is not stored in the data cache area 400, the user data stored in the NAND memory 210 is transferred to the host-used area 101 for storage.

The operation from the issuance of the write command by the CPU 110 to storing the user data in the data cache area 400 or the NAND memory 210 is referred to as a write operation. The operation from the issuance of the first read command by the CPU 110 to storing the user data to be read in the host-used area 101 is referred to as a read operation.

A part or all of the structures of the host controller 120 and the device controller 200 may be implemented by hardware such as a circuit or the function of a processor such as a hardware processor having a loaded program.

Figure 3:
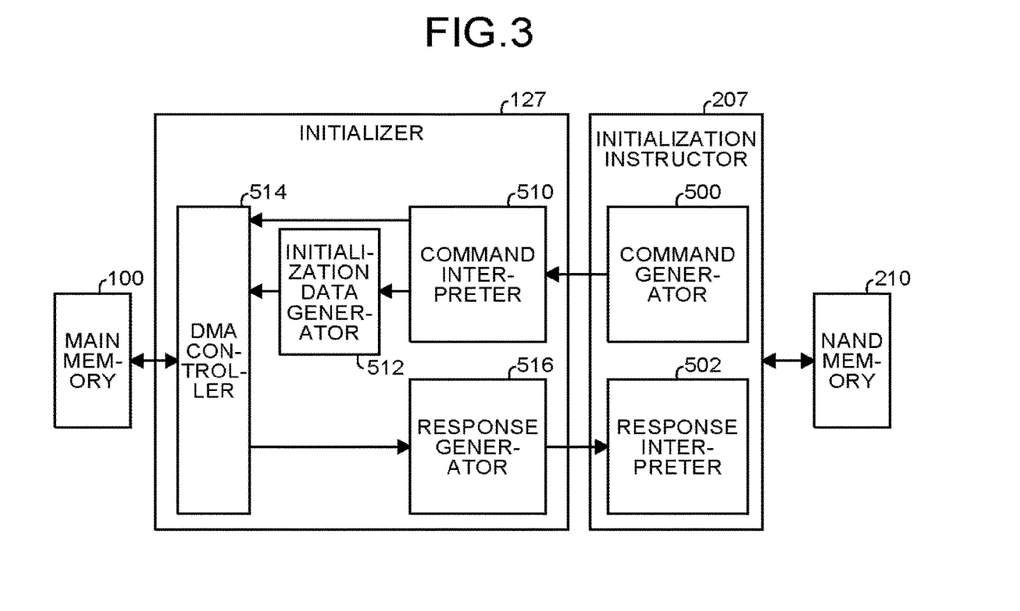
FIG. 3 is a block diagram illustrating the structures of an initialization instructor and an initializer.

FIG. 3 is a block diagram illustrating the structures of the initialization instructor 207 and the initializer 127. In FIG. 3, the elements between the initializer 127 and the main memory 100 are omitted. In addition, the elements between the initialization instructor 207 and the initializer 127 and the elements between the initialization instructor 207 and the NAND memory 210 are also omitted.

As illustrated in FIG. 3, the initialization instructor 207 includes a command generator 500 and a response interpreter 502. A part or all of the structures of the command generator 500 and the response interpreter 502 may be implemented by hardware such as a circuit or the function of a processor such as a hardware processor having a loaded program.

The command generator 500 generates an initialization command to initialize the main memory 100. An example of the area of the main memory 100 to be initialized is the device-used area 102 which is also a working area. The initialization command indicates an initialization method for the main memory 100. For example, the command generator 500 can determine an initialization method using initialization data selected from initialization data items, according to an intended use of the area to be initialized in the main memory 100. For example, to use the area to be initialized in the main memory 100 as a cache tag and initialize at least a valid-bit area, the command generator 500 determines an initialization method using initialization data having all "0". The command generator 500 transmits the generated initialization command to a command interpreter 510 of the initializer 127 which will be described below.

The response interpreter 502 receives a response from a response generator 516 of the initializer 127 which will be described below. The response interpreter 502 interprets the received response to determine a success or failure of the initialization of the main memory 100.

The initializer 127 includes the command interpreter 510, an initialization data generator 512, a DMA controller 514, and the response generator 516. A part or all of the structures of the command interpreter 510, the initialization data generator 512, the DMA controller 514, and the response generator 516 can be implemented by hardware such as a circuit or the function of a processor such as a hardware processor having a loaded program.

The command interpretation unit 510 interprets the initialization command received from the command generator 500. The command interpreter 510 transmits initialization information to the DMA controller 514 according to the interpreted initialization command. The initialization information includes, for example, information on the area of the main memory 100 such as a start address of the area to be initialized in the main memory 100 and an initialization length indicating the length of the area. The command interpreter 510 transmits pattern information to the initialization data generator 512 according to the interpreted initialization command. The pattern information includes, for example, information such as an initialization method for the type of initialization data written to the main memory 100 for initialization.

The initialization data generator 512 generates initialization data representing a pattern for initializing the main memory 100, on the basis of the pattern information received from the command interpreter 510. The initialization data generator 512 transmits the generated initialization data to the DMA controller 514.

The DMA controller 514 initializes the main memory 100 according to the initialization command interpreted by the command interpreter 510. The DMA controller 514 performs write access to the main memory 100 and initializes the device-used area 102 of the main memory 100 on the basis of the initialization information received from the command interpreter 510 and the initialization data received from the initialization data generator 512. The DMA controller 514 determines a success or failure of the initialization of the device-used area 102 and transmits a result of the determination about the initialization to the response generator 516.

The response generator 516 generates a response indicating a success or failure of the initialization on the basis of the initialization determination result received from the DMA controller 514. The response generator 516 transmits the generated response to the response interpreter 502.

Figure 4:
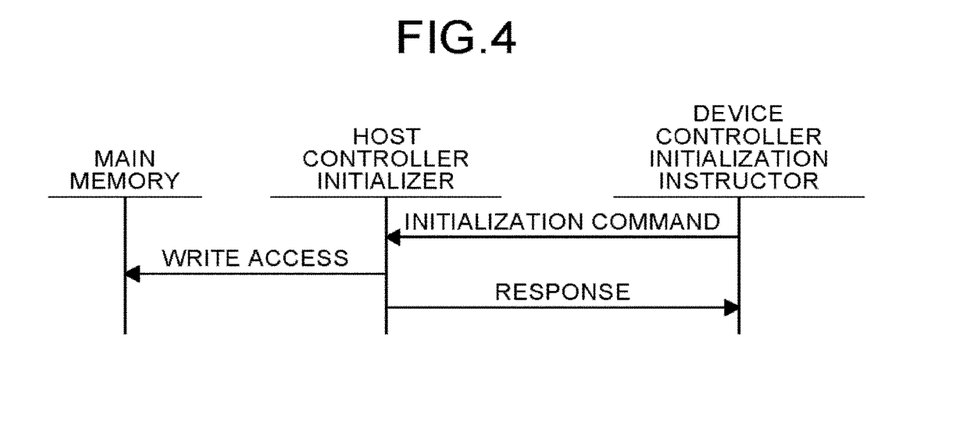
FIG. 4 is a diagram illustrating a main memory initialization process.

FIG. 4 is a diagram illustrating the initialization processing to the main memory 100. The initialization instructor 207 of the device controller 200 generates an initialization command and transmits the initialization command to the initializer 127 of the host controller 120. The initializer 127 performs write access to the main memory 100 and writes initialization data to the main memory 100 for initialization on the basis of the content of the initialization command. The initializer 127 generates a response according to a success or a failure of the initialization of the main memory 100 and transmits the response to the initialization instructor 207. The initialization instructor 207 determines whether the initialization of the main memory 100 has succeeded or failed on the basis of the received response.

Figure 5:
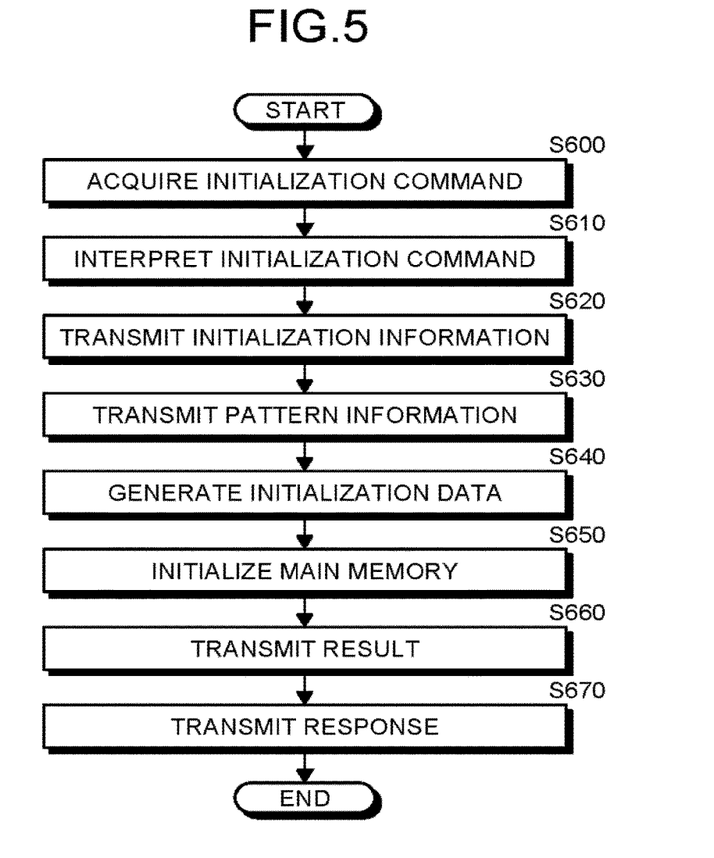
FIG. 5 is a flowchart of an initialization process by the initializer.

FIG. 5 is a flowchart illustrating the initialization processing by the initializer 127. As illustrated in FIG. 5, in the initializer 127, first, the command interpreter 510 acquires the initialization command generated and transmitted by the command generator 500 of the initialization instructor 207 (S600). The command interpreter 510 interprets the initialization command (S610). For example, the command interpreter 510 interprets the initialization command to acquire the initialization information and the pattern information.

The command interpreter 510 transmits the initialization information to the DMA controller 514 (S620). The command interpreter 510 transmits the pattern information to the initialization data generator 512 (S630). However, the command interpreter 510 can transmit a portion of the pattern information to the DMA controller 514.

The initialization data generator 512 generates initialization data on the basis of the pattern information received from the command interpreter 510 and transmits the initialization data to the DMA controller 514 (S640). However, the initialization data generator 512 can receive a portion of the pattern information from the DMA controller 514. The DMA controller 514 initializes the area of the main memory 100 indicated by the initialization information transmitted from the command interpreter 510, using the initialization data transmitted from the initialization data generator 512 (S650). The DMA controller 514 transmits a result of the initialization, that is, success or failure, to the response generator 516 (S660). The response generator 516 transmits a response indicating a success or failure of the initialization to the response interpreter 502 on the basis of the received result (S670).

Figure 6:
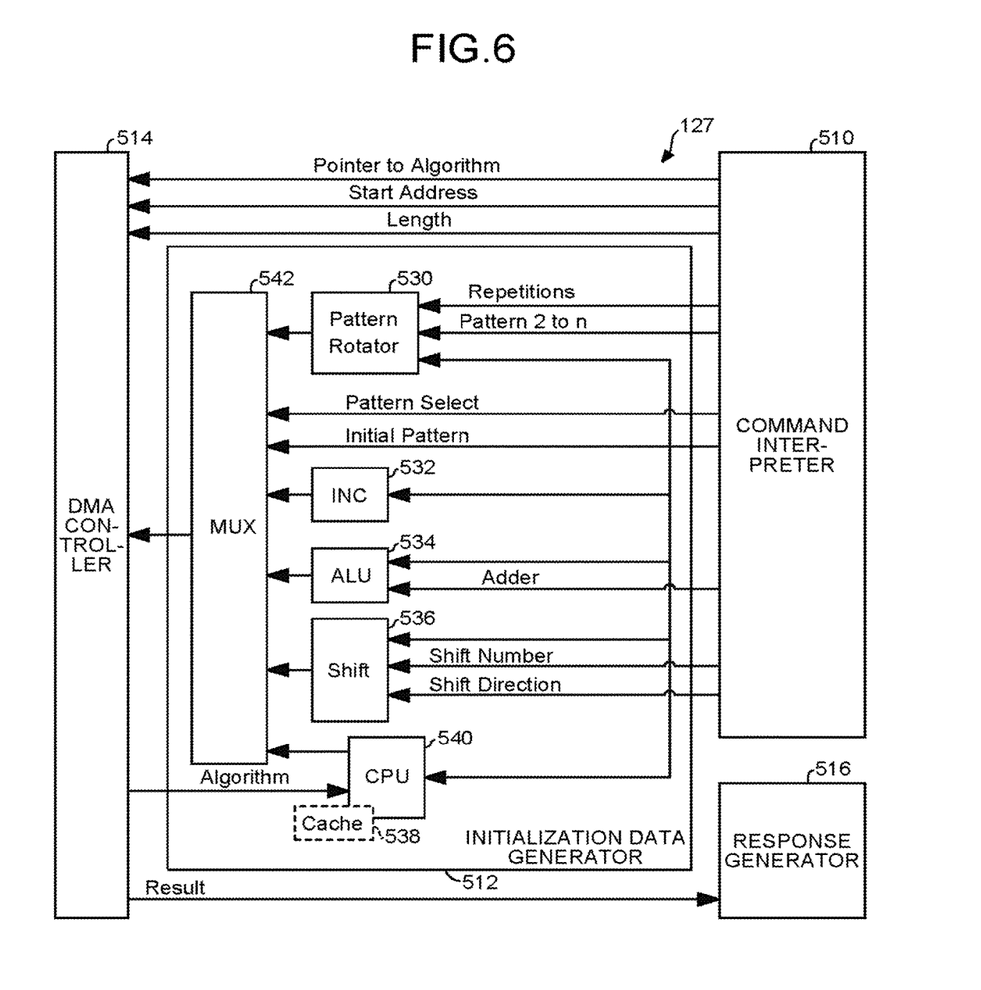
FIG. 6 is a block diagram illustrating the structure of the initializer.

FIG. 6 is a block diagram illustrating the structure of the initializer 127. As illustrated in FIG. 6, the initialization data generator 512 of the initializer 127 includes a pattern rotator 530, an incrementer 532, an arithmetic logic unit (ALU) 534, a shifter 536, a CPU 540 having a cache 538, and a multiplexer (MUX)542. The functions of the pattern rotator 530, the incrementer 532, the ALU 534, the shifter 536, the CPU 540 having the cache 538, and the MUX 542 will be described below together with the corresponding initialization commands.

FIGS. 7 to 13 are diagrams illustrating examples of the packet structure of the initialization command. In FIGS. 7 to 13, as for packets of the same content, only the content of an initial packet will be described. In addition, for example, the values of a later-described opcode and the initialization data are represented in hexadecimal as "XXX . . . XXh" using "h", represented in binary as "XXX . . . XXb" using "b", and represented in decimal as "XXX . . . XX" without using "h" and "b".

Figure 7:
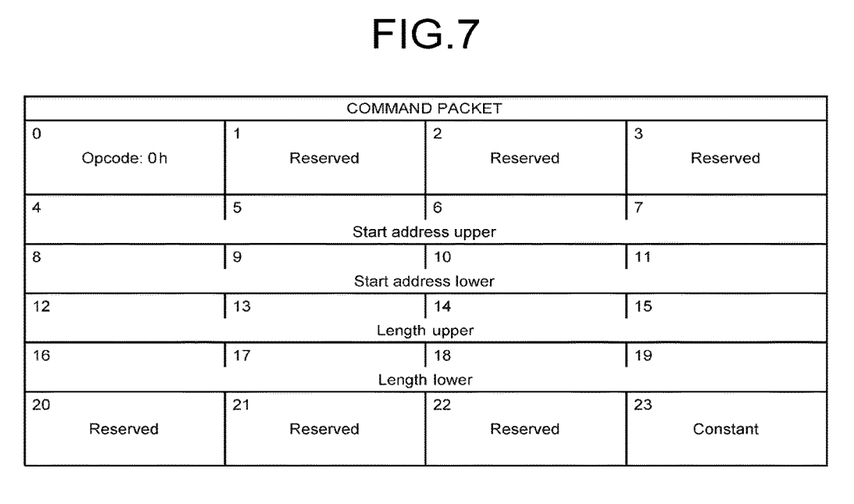
FIG. 7 illustrates an example of an initialization command for initialization using initialization data in which constants are consecutive.

FIG. 7 illustrates an example of the initialization command generated by the initialization instructor 207 for initialization with initialization data having consecutive constants. The initialization command in FIG. 7 includes an opcode (opcode), a start address, an initialization length (length), and a constant. Further, "reserved" is intended to ensure the length of the initialization command and does not indicate specific information.

The opcode indicates an initialization command and an initialization method. Therefore, the opcode differs depending on the initialization command. In the example illustrated in FIG. 7, the opcode "0h" indicates that the initialization data is a pattern in which the same constants are consecutive.

The start address indicates the initial address of the area to be initialized in the device-used area 102 of the main memory 100. The start address may include "start address upper" and "start address lower". The "start address upper" indicates the upper side (for example, the upper 32 bits) of the start address of the area to be initialized. The "start address lower" indicates the lower side (for example, the lower 32 bits) of the start address of the area to be initialized.

The initialization length indicates the length of the area to be initialized in the device-used area 102 of the main memory 100. The initialization length may include "initialization length upper" (length upper) and "initialization length lower" (length lower). The "initialization length upper" indicates the upper side (for example, the upper 32 bits) of the initialization length. The "initialization length lower" indicates the lower side (for example, the lower 32 bits) of the initialization length.

The constant indicates a value written to the main memory 100 for initialization. For example, the constant is consecutive "0b" or "1b".

A description will be made on a receipt of the initialization command in FIG. 7 by the command interpreter 510 from the command generator 500. In this case, the command interpreter 510 interprets the opcode "0h" in the initialization command as the initialization method using the initialization data in which the same constants are consecutive. The command interpreter 510 transmits the start address and the initialization length to the DMA controller 514. In addition, the command interpreter 510 transmits, as the initialization data, to the MUX 542, a pattern select indicating that the initialization data in which the same constants are consecutive and a constant serving as a predetermined initial pattern on the basis of the interpreted initialization command. Note that the command interpreter 510 transmits the initial pattern to the pattern rotator 530, the incrementer 532, the ALU 534, the shifter 536, and the CPU 540 in addition to the MUX 542. Therefore, the MUX 542 receives the initialization data from each of the pattern rotator 530, the incrementer 532, the ALU 534, the shifter 536, and the CPU 540.

The MUX 542 selects any one of the initialization data items according to the received pattern select and transmits the selected initialization data to the DMA controller 514. In the example illustrated in FIG. 7, the MUX 542 transmits the initialization data in which the constant is repeated and which has been received as the initial pattern, to the DMA controller 514. The DMA controller 514 writes the initialization data in which the same constants are consecutive, to the area in the initialization length from the address of the main memory 100 indicated by the start address. For example, the DMA controller 514 writes, as the initialization data, a sequence of 64 consecutive "0b"s, "000 . . . 0b" or a sequence of 64 consecutive "1b"s, "111 . . . 1b" to initialize the area. However, in hexadecimal, 64 consecutive "0bs", "000 . . . 0b" is represented as a sequence of eight consecutive "0h"s, "00000000h". Also, in hexadecimal, 64 consecutive "1b"s, "111 . . . 1b" represented as eight consecutive "Fh"s, "FFFFFFFFh". When the main memory 100 is initialized, the DMA controller 514 transmits the effect that the main memory 100 has been initialized to the response generator 516. The response generator 516 generates a response indicating the success of the initialization of the main memory 100 and transmits the response to the response interpreter 502. The response interpreter 502 interprets the response and recognizes that the initialization has succeeded.

Figure 8:
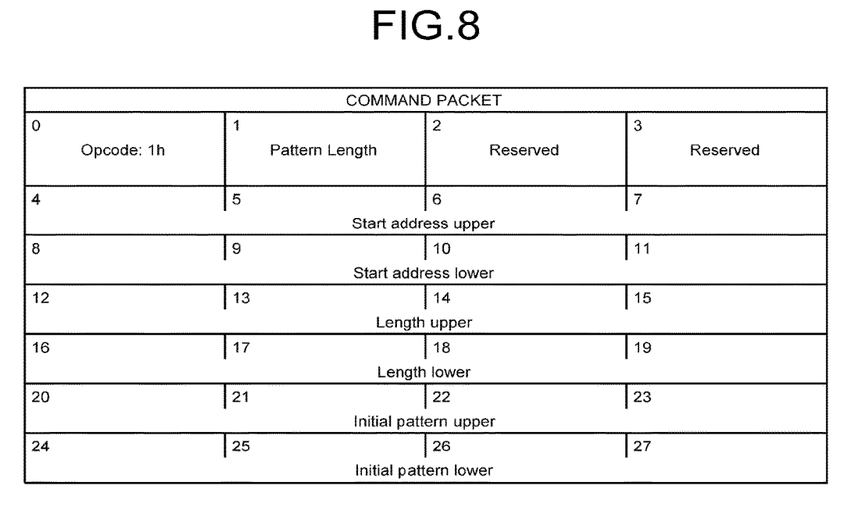
FIG. 8 illustrates an example of the initialization command for initialization using initialization data in which the same initial pattern is repeated.

FIG. 8 illustrates an example of the initialization command generated by the initialization instructor 207 for initialization with initialization data in which the same initial pattern is repeated. The initialization command illustrated in FIG. 8 includes an opcode, a pattern length, a start address, an initialization length (length), and an initial pattern.

The opcode "1h" in FIG. 8 indicates that the initialization data shows a pattern in which the same initial pattern is repeated.

The pattern length indicates the number of valid bits in a pattern area of the initial pattern. For example, when the pattern area of the initial pattern is 64 bits and the pattern length indicates any value from 1 to 64, the value of the area in the pattern length from the lower side of the pattern area of the 64-bit initial pattern is the valid bit of the initial pattern. The area of the main memory 100 corresponding to a non-valid bit area of the 64-bit initial pattern retains original data.

The initial pattern is a repetitive pattern, that is, a unit pattern. For example, the initial pattern is "0123456789ABCDEFh". The initial pattern may include "initial pattern upper" which indicates the upper side (for example, the upper 32 bits) of the initial pattern and "initial pattern lower" which indicates the lower side (for example, the lower 32 bits) of the initial pattern.

When receiving the initialization command illustrated in FIG. 8, the command interpreter 510 interprets the opcode "1" in the command as the initialization method using the initialization data in which the initial pattern is repeated. The command interpreter 510 transmits the start address and the initialization length to the DMA controller 514. In addition, the command interpreter 510 transmits a pattern select indicating that the initialization data is a pattern in which the initial pattern is repeated and the initial pattern to the MUX 542 on the basis of the interpreted initialization command.

The MUX 542 selects any one of the initialization data items according to the received pattern select and transmits the selected initialization data to the DMA controller 514. In the example illustrated in FIG. 8, the MUX 542 repeatedly transmits the received initial pattern as the initialization data to the DMA controller 514 a plurality of times. The DMA controller 514 writes the initialization data in which the initial pattern is repeated, to the area in the initialization length from the address of the main memory 100 indicated by the start address to initialize the main memory 100. For example, when the valid bits of the initial pattern are "0123456789ABCDEFh", the DMA controller 514 writes, to the main memory 100, the initialization data in which "0123456789ABCDEFh" is continuously repeated.

Figure 9:
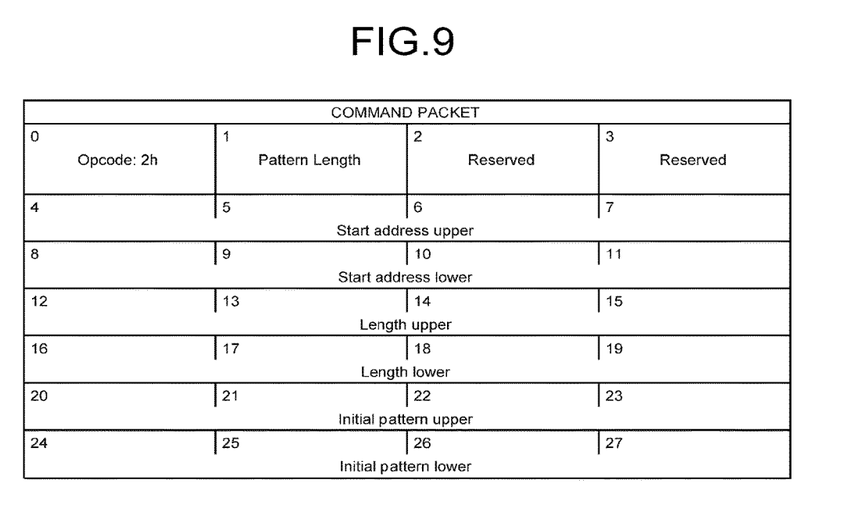
FIG. 9 illustrates an example of the initialization command for initialization using initialization data including a value obtained by incrementing the initial pattern.

FIG. 9 illustrates an example of the initialization command generated by the initialization instructor 207 for initialization with initialization data including a value obtained by incrementing the initial pattern. The initialization command illustrated in FIG. 9 includes an opcode, a pattern length, a start address, an initialization length (length), and an initial pattern.

The opcode "2h" in FIG. 9 indicates that the initialization data is a pattern in which the values obtained by incrementing the initial pattern are consecutive.

When receiving the initialization command illustrated in FIG. 9, the command interpreter 510 interprets the opcode "2h" in the command as the initialization method using initialization data in which the values obtained by incrementing the initial pattern by 1 are consecutive. The command interpreter 510 transmits the start address and the initialization length to the DMA controller 514.

In addition, the command interpreter 510 transmits, to the MUX 542, a pattern select indicating that the initialization data is a pattern in which the values obtained by incrementing the initial pattern are consecutive, on the basis of the interpreted initialization command. The command interpreter 510 transmits the initial pattern to the incrementer 532.

The incrementer 532 sequentially transmits a plurality of consecutive values, which are obtained by incrementing the initial pattern by 1 a plurality of times, as the initialization data to the MUX 542. For example, when the initial pattern is "0000000000000000h", the incrementer 532 sequentially transmits "0000000000000000h", "0000000000000001h", "0000000000000002h", . . . to the MUX 542.

The MUX 542 selects any one of the initialization data items according to the received pattern select and transmits the selected initialization data to the DMA controller 514. In the example illustrated in FIG. 9, the MUX 542 sequentially transmits a plurality of values, which are obtained by incrementing the initial pattern received from the incrementer 532, as the initialization data to the DMA controller 514. The DMA controller 514 writes the initialization data in which the incremented values are consecutive, to the area in the initialization length from the address of the main memory 100 indicated by the start address to initialize the main memory 100. For example, the DMA controller 514 sequentially writes the values "00 . . . 0h", "00 . . . 1h", "00 . . . 2h", . . . as the initialization data to the main memory 100.

Figure 10:
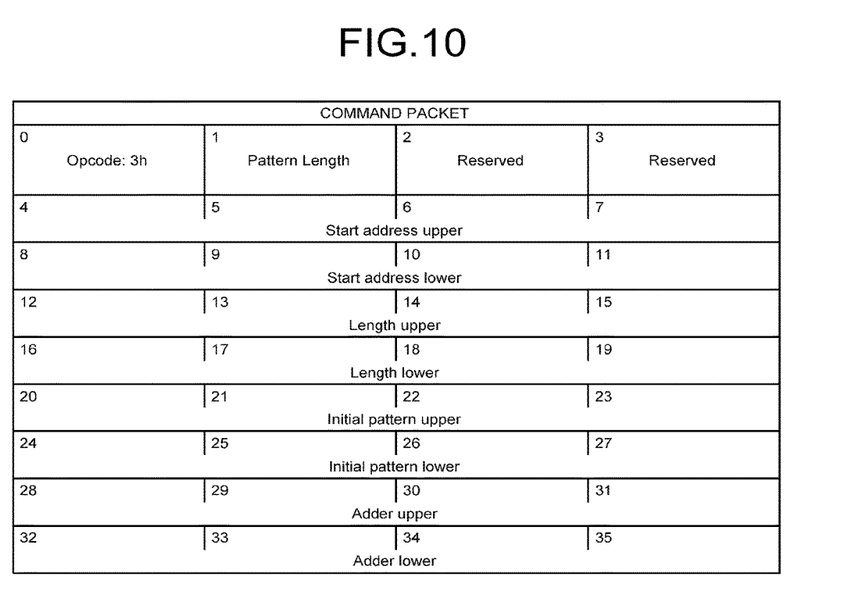
FIG. 10 illustrates an example of the initialization command for initialization using initialization data including a value obtained by adding an addition value to the initial pattern.

FIG. 10 illustrates an example of the initialization command generated by the initialization instructor 207 for initialization with initialization data including a value obtained by adding an addition value to the initial pattern. The initialization command illustrated in FIG. 10 includes an opcode, a pattern length, a start address, an initialization length (length), an initial pattern, and an addition value (adder).

The opcode "3h" in FIG. 10 indicates that the initialization data is a pattern including a value obtained by adding the addition value to the initial pattern.

The addition value indicates a value added to the initial pattern. The addition value may include "addition value upper" (adder upper) and "addition value lower" (adder lower). The "addition value upper" indicates the upper side (for example, the upper 32 bits) of the addition value. The "addition value lower" indicates the lower side (for example, the lower 32 bits) of the addition value.

When receiving the initialization command illustrated in FIG. 10, the command interpreter 510 interprets the opcode "3h" in the command as the initialization method using initialization data including the value obtained by adding the addition value to the initial pattern. The command interpreter 510 transmits the start address and the initialization length to the DMA controller 514. In addition, the command interpreter 510 transmits, to the MUX 542, a pattern select indicating that the initialization data is a pattern including the value obtained by adding the addition value to the initial pattern, on the basis of the interpreted initialization command. The command interpreter 510 transmits the initial pattern and the addition value to the ALU 534.

The ALU 534 sequentially transmits the values obtained by adding the addition value to the initial pattern a plurality of times, as the initialization data to the MUX 542. For example, when the initial pattern is "0000000000000000h" and the addition value is "1000h", the ALU 534 sequentially transmits "0000000000000000h", "0000000000001000", "0000000000002000h", . . . to the MUX 542.

The MUX 542 selects any one of the initialization data items according to the received pattern select and transmits the selected initialization data to the DMA controller 514. In the example illustrated in FIG. 10, the MUX 542 transmits the initialization data received from the ALU 534, including the value obtained by adding the addition value to the initial pattern, to the DMA controller 514. The DMA controller 514 writes the initialization data in which the values obtained by adding the addition value to the initial pattern are consecutive, to the area in the initialization length from the address of the main memory 100 indicated by the start address to initialize the main memory 100. For example, the DMA controller 514 sequentially writes the values "00 . . . 0000h", "00 . . . 1000h", "00 . . . 2000h", . . . as the initialization data to the main memory 100.

Figure 11:
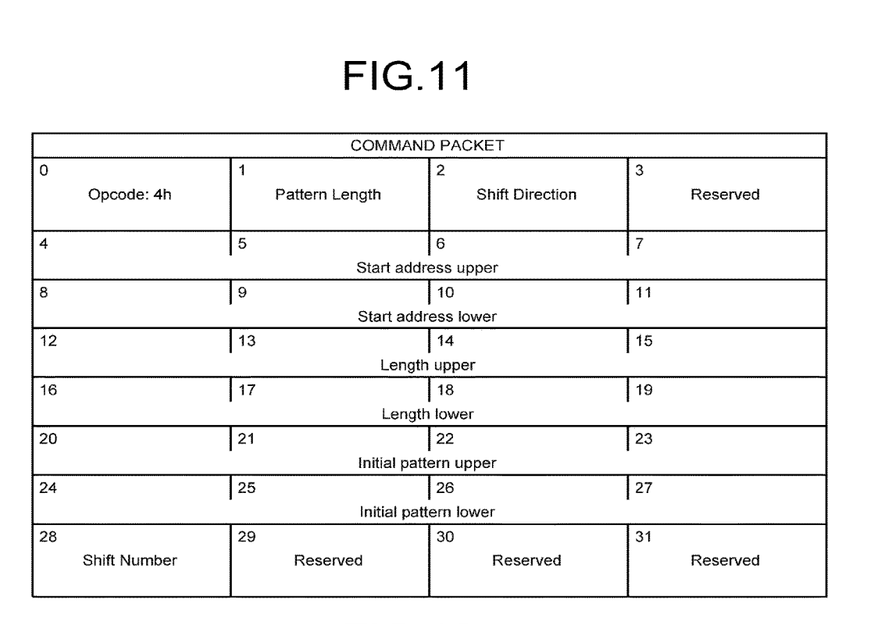
FIG. 11 illustrates an example of the initialization command for initialization using initialization data including a value obtained by shifting a value in the initial pattern.

FIG. 11 illustrates an example of the initialization command generated by the initialization instructor 207 for initialization with initialization data including a value obtained by shifting the value in the initial pattern. The initialization command illustrated in FIG. 11 includes an opcode, a pattern length, a shift direction, a start address, an initialization length (length), an initial pattern, and a shift number.

The opcode "4h" in FIG. 11 indicates that the initialization data is a pattern including a value obtained by shifting the value in the initial pattern.

The shift direction indicates the direction in which the value in the initial pattern is shifted, that is, a left direction (high-order digit) or a right direction (lower-order digit). For example, it can be set that the shift direction "0b" indicates the left direction and "1b" indicates the right direction.

The shift number represents by a bit number that the value in the initial pattern is shifted in a direction indicated by the shift direction. For example, the shift number is one of the numbers "1" to "63".

When receiving the initialization command illustrated in FIG. 11, the command interpreter 510 zinterprets the opcode "4h" in the command as the initialization method using initialization data including a value obtained by shifting the value in the initial pattern. The command interpreter 510 transmits the start address and the initialization length to the DMA controller 514.

In addition, the command interpreter 510 transmits, to the MUX 542, a pattern select indicating that the initialization data is a pattern including the value obtained by shifting the value in the initial pattern, on the basis of the interpreted initialization command. The command interpreter 510 transmits the initial pattern, the shift number, and the shift direction to the shifter 536.

The shifter 536 sequentially transmits values obtained by shifting a certain value (for example, "1") in the initial pattern by the shift number, as the initialization data to the MUX 542. For example, when the initial pattern is "0000000000000001h", the shift direction is "0b" indicating the left direction, and the shift number is "4", the shifter 536 sequentially transmits the values "0000000000000001h", "0000000000000010h", "0000000000000100h", . . . to the MUX 542.

The MUX 542 selects any one of the initialization data items according to the received pattern select and transmits the selected initialization data to the DMA controller 514. In the example illustrated in FIG. 11, the MUX 542 transmits the initialization data received from the shifter 536, including the value obtained by shifting the initial pattern, to the DMA controller 514. The DMA controller 514 writes the initialization data in which the values obtained by shifting the initial pattern are consecutive, to the area in the initialization length from the address of the main memory 100 indicated by the start address to initialize the main memory 100. For example, the DMA controller 514 sequentially writes the values "00 . . . 001h", "00 . . . 010h", "00 . . . 100h", . . . as the initialization data to the main memory 100.

Figure 12:
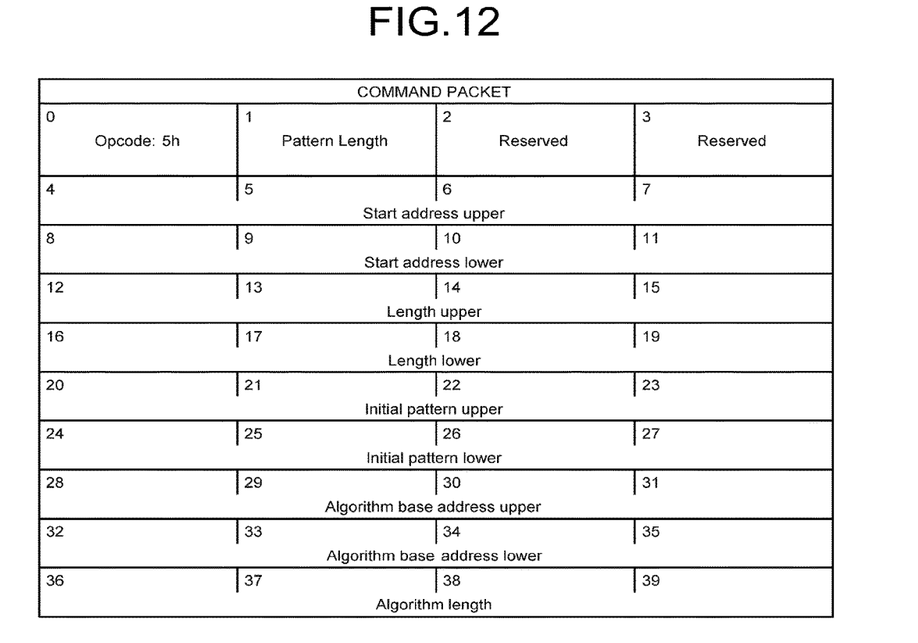
FIG. 12 illustrates an example of the initialization command for initialization using initialization data including a value obtained by performing an operation on the initial pattern by an algorithm.

FIG. 12 illustrates an example of the initialization command generated by the initialization instructor 207 for initialization with initialization data including a value obtained by performing an operation on the initial pattern by an algorithm. The initialization command illustrated in FIG. 12 includes an opcode, a pattern length, a start address, an initialization length (length), an initial pattern, an algorithm base address, and an algorithm length. For example, the algorithm is stored in the main memory 100 in advance by the memory system 2.

The opcode "5h" in FIG. 12 indicates that the initialization data is a pattern including a value obtained by performing an operation on the initial pattern by the algorithm.

The algorithm base address indicates the address of the algorithm stored in the main memory 100. The algorithm base address may include "algorithm base address upper" and "algorithm base address lower". The "algorithm base address upper" indicates the upper side (for example, the upper 32 bits) of the start address of the area of the main memory 100 in which the algorithm is stored. The "algorithm base address lower" indicates the lower side (for example, the lower 32 bits) of the start address of the area of the main memory 100 in which the algorithm is stored.

The algorithm length indicates the length of the area of the main memory 100 in which the algorithm is stored.

When receiving the initialization command illustrated in FIG. 12, the command interpreter 510 interprets the opcode "5h" in the command as the initialization method using initialization data including a value obtained by performing an operation on the initial pattern. The command interpreter 510 transmits a pointer of the algorithm including the start address, the initialization length, the algorithm base address, and the algorithm length to the DMA controller 514. In addition, the command interpreter 510 transmits, to the MUX 542, a pattern select indicating that the initialization data is a pattern including the value obtained by performing the operation on the initial pattern, on the basis of the interpreted initialization command.

The DMA controller 514 acquires an algorithm from the main memory 100 on the basis of the algorithm base address and algorithm length of the pointer. The DMA controller 514 transmits the acquired algorithm to the CPU 540.

The CPU 540 stores the algorithm received from the DMA controller 514 in the cache 538. The CPU 540 transmits, as the initialization data, the value obtained by performing the operation on the initial pattern by the algorithm from the cache 538 to the MUX 542. For example, the CPU 540 transmits a value obtained by dividing the initial pattern by 7 and adding a value twice the initial pattern to the remainder of the division by the algorithm, as the initialization data to the MUX 542. Then, the CPU 540 repeatedly obtains the value by dividing the previous initialization data transmitted to the MUX 542 by 7 and adding a value twice the initial pattern to the remainder of the division and transmits the obtained value as new initialization data to the MUX 542.

The MUX 542 selects any one of the initialization data items according to the received pattern select and transmits the selected initialization data to the DMA controller 514. In the example illustrated in FIG. 12, the MUX 542 transmits the initialization data received from the CPU 540, including the value obtained by performing the operation on the initial pattern, to the DMA controller 514. The DMA controller 514 sequentially writes the initialization data including the value obtained from the operation on the initial pattern, to the area in the initialization length from the address of the main memory 100 indicated by the start address to initialize the main memory 100.

Figure 13:
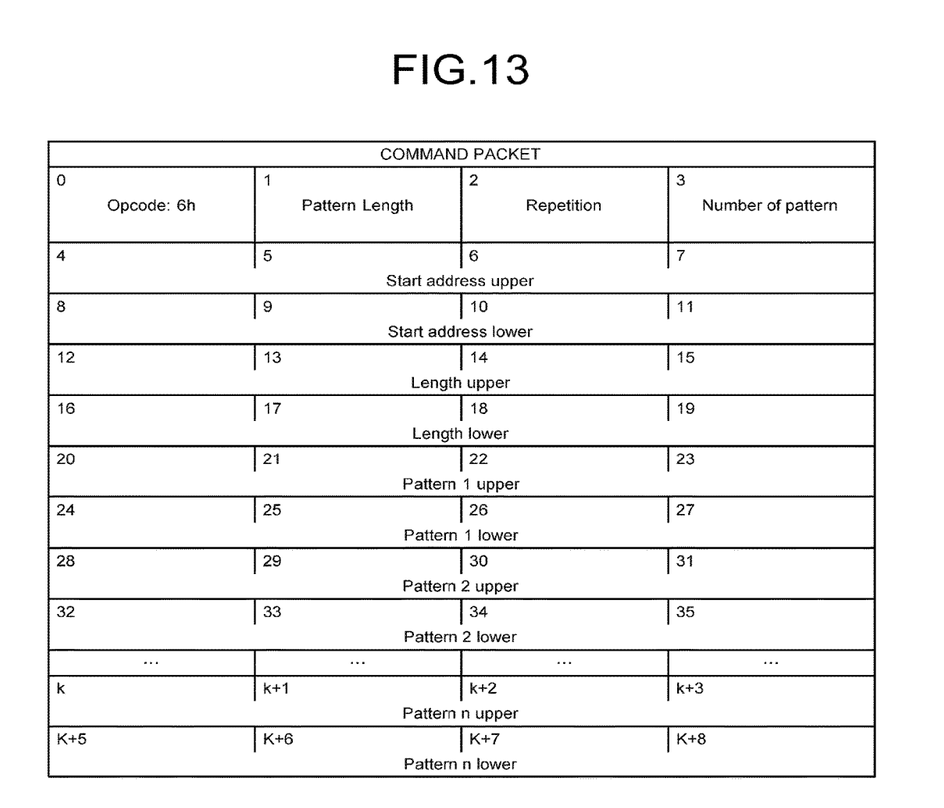
FIG. 13 illustrates an example of the initialization command for initialization using initialization data including a value obtained by repeating a plurality of repetitive patterns.

FIG. 13 illustrates an example of the initialization command generated by the initialization instructor 207 for initialization with initialization data including a value obtained by repeating a plurality of repetitive patterns. The initialization command illustrated in FIG. 13 includes an opcode, a pattern length, the number of repetitions (repetition), the number of patterns, a start address, an initialization length (length), and a plurality of repetitive patterns (pattern 1, pattern 2, . . . , pattern n).

The opcode "6h" in FIG. 13 indicates that the initialization data is a pattern including a value obtained by repeating a plurality of repetitive patterns.

The number of repetitions indicates the number of repetitions in each repetitive pattern. Thus, when the number of repetitions is 2, the repetitive pattern "pattern 1" is repeated twice and then the repetitive pattern "pattern 2" is repeated twice. This operation is repeated up to the repetitive pattern "pattern n" to generate initialization data. When the repetition of the last repetitive pattern "pattern n" is completed, the repetitive pattern "pattern 1" is used again.

The number of patterns indicates the number of repetitive patterns. For example, the number of patterns is represented by 8 bits. That is, the number of patterns indicates 1 to 255. However, when the number of patterns is 0, it indicates "reserved".

The repetitive pattern is a predetermined constant such as "0000 . . . 0h", "1111 . . . 1h", or "FFFF . . . Fh". The repetitive pattern may include "repetitive pattern upper" and "repetitive pattern lower". The "repetitive pattern upper" indicates the upper side (for example, the upper 32 bits) of the repetitive pattern. The "repetitive pattern lower" indicates the lower side (for example, the lower 32 bits) of the repetitive pattern.

When receiving the initialization command illustrated in FIG. 13, the command interpreter 510 interprets the opcode "6h" in the command as the initialization method with initialization data including a value obtained by repeating a plurality of repetitive patterns. The command interpreter 510 transmits the start address and the initialization length to the DMA controller 514. In addition, the command interpreter 510 transmits, to the MUX 542, a pattern select indicating that the initialization data is a pattern including the value obtained by repeating a plurality of repetitive patterns, on the basis of the interpreted initialization command.

The command interpreter 510 transmits the number of repetitions and the number of repetitive patterns indicated by the number of patterns to the pattern rotator 530. The command interpreter 510 transmits a basic pattern "pattern 1" among the plurality of repetitive patterns as an initial pattern to the pattern rotator 530.

The pattern rotator 530 generates initialization data on the basis of the number of repetitions and the plurality of repetitive patterns received from the command interpreter 510, and transmits the initialization data to the MUX 542. For example, the number of repetitions is set to "2", the repetitive pattern "pattern 1" is set to "00 . . . 00h", and the repetitive pattern "pattern 2" is set to "11 . . . 11h". Herein, the pattern rotator 530 sequentially transmits the values "00 . . . 00h", "11 . . . 11h", . . . in which each repetitive pattern is repeated twice as the initialization data to the MUX 542.

The MUX 542 selects any one of the initialization data items according to the received pattern select and transmits the selected initialization data to the DMA controller 514. In the example illustrated in FIG. 13, the MUX 542 transmits the initialization data received from the pattern rotator 530, including the value obtained by repeating a plurality of repetitive patterns, to the DMA controller 514. The DMA controller 514 sequentially writes the initialization data including the value obtained by repeating the repetitive patterns to the area in the initialization length from the address of the main memory 100 indicated by the start address to initialize the main memory 100.

As described above, the memory system 2 of the information processing device according to the embodiment generates an initialization command to instruct the initialization of the main memory 100 and transmits the initialization command to the host 1. Thereby, the memory system 2 is able to increase an initialization speed while reducing the amount of data transmitted for the initialization.

In the memory system 2 the initialization command can contain the operand indicating the initialization method with any one of a plurality of kinds of initialization data. Thereby, the main memory 100 can be initialized by selecting one of the kinds of initialization data.

The memory system 2 can initialize the main memory 100, using the initialization data in which the constant "0b"s or "1b"s is continuously repeated. Therefore, the memory system 2 can generate the initialization command including the value of the initialization data together with the operand indicating the initialization method. As a result, the memory system 2 is able to further reduce the amount of data in the initialization command.

The memory system 2 can initialize the main memory 100, using the initialization data in which the same initial pattern is repeated. The memory system 2 generates the initialization command containing the initial pattern to be repeated together with the operand indicating the initialization method. Thereby, the memory system 2 is able to initialize the main memory, using the initialization data including different values not only the same value, while reducing the amount of data in the initialization command.

The memory system 2 can initialize the main memory 100, using the initialization data including the value obtained by incrementing the initial pattern. The memory system 2 generates the initialization command containing the initial pattern together with the operand indicating the initialization method. Thereby, the memory system 2 is able to initialize the main memory, using the initialization data in which different values continuously incremented are consecutive, while reducing the amount of data in the initialization command.

The memory system 2 can initialize the main memory 100, using the initialization data including the value obtained by adding the addition value to the initial pattern. The memory system 2 generates the initialization command including the initial pattern and the addition value together with the operand indicating the initialization method. Thereby, the memory system 2 is able to initialize the main memory, using the initialization data in which mutually different values resulting from the addition are consecutive, while reducing the amount of data in the initialization command.

The memory system 2 can initialize the main memory 100, using the initialization data including the value obtained by shifting the initial pattern. The memory system 2 generates the initialization command including the initial pattern, the shift direction, and the shift number together with the operand indicating the initialization method. Thereby, the memory system 2 is able to initialize the main memory, using the initialization data in which mutually different values shifted by the shift number in the shift direction are consecutive, while reducing the amount of data in the initialization command.

The memory system 2 can initialize the main memory 100, using the initialization data including the value obtained by performing the operation on the initial pattern by the algorithm. The memory system 2 generates the initialization command containing the initial pattern and information about the algorithm together with the operand indicating the initialization method. Thereby, the memory system 2 is able to initialize the main memory, using the initialization data in which the values calculated by the algorithm with a higher degree of freedom are consecutive, while reducing the amount of data in the initialization command.

The memory system 2 can initialize the main memory 100, using the initialization data containing the value obtained by repeating different repetitive patterns. The memory system 2 generates the initialization command containing the initial pattern, and the different repetitive patterns together with the operand indicating the initialization method. Thereby, the memory system 2 is able to initialize the main memory, using the initialization data including the value obtained by repeating the different repetitive patterns, while reducing the amount of data in the initialization command.

The host 1 of the information processing device according to the embodiment initializes the main memory 100 in response to the initialization command received from the memory system 2. Therefore, the host 1 can increase the initialization speed while reducing the amount of data received for initialization. The host 1 interprets the type of initialization data to initialize the main memory 100, thereby improving the degree of freedom in initialization.

While the embodiment of the invention has been described, the embodiment has been presented by way of example only, and is not intended to limit the scope of the invention. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the function and connection relationship of each component in the above-described embodiment may be appropriately changed. In addition, the order of the operations in the above-described embodiment may be appropriately changed.

The internal structure of the initialization data generator 512 in the above-described embodiment may be appropriately changed. For example, any one of the pattern rotator 530, the incrementer 532, the ALU 534, the shifter 536, and the CPU 540 may be omissible.

What is claimed is:

1. A memory system comprising:
    an interface connected to a host including a main memory and a processor to control the main memory; and
    a control circuit that generates an initialization command among a plurality of initialization commands and transmits the generated initialization command to the host, the initialization command representing a command for instructing the host to execute initialization of the main memory and indicating an initialization method among a plurality of initialization methods for the main memory, the initialization method corresponding to a pattern of initialization data,
    wherein the initialization command generated by the control circuit indicates the initialization method using initialization data including a value obtained by any one of incrementing a predetermined initial pattern, adding a predetermined addition value to a predetermined initial pattern, shifting a value in a predetermined initial pattern, or performing an operation on a predetermined initial pattern by a predetermined algorithm.

2. The memory system according to claim 1, wherein the control circuit receives a response indicating a success or failure of the initialization from the host and interprets the success or failure of the initialization.

3. The memory system according to claim 1, wherein the control circuit generates an initialization command indicating the initialization method using initialization data in which a constant is repeated.

4. The memory system according to claim 1, wherein the control circuit generates an initialization command indicating the initialization method using initialization data in which a predetermined initial pattern is repeated.

5. The memory system according to claim 1, wherein the control circuit generates an initialization command indicating the initialization method using initialization data including a value obtained by repeating a plurality of predetermined repetitive patterns.

6. An electric device comprising:
a main memory; and
a control circuit that receives an initialization command among a plurality of initialization commands from a memory system, interprets the received initialization command, the initialization command representing a command for instructing the host to execute initialization of the main memory and indicating an initialization method among a plurality of initialization methods for the main memory, the initialization method corresponding to a pattern of initialization data, and initializes the main memory by a pattern among a plurality of patterns, indicated by the interpreted initialization command,
the electric device further comprising
an initialization data generator that generates initialization data including a value obtained by any one of incrementing a predetermined initial pattern, adding a predetermined addition value to a predetermined initial pattern, shifting a value in a predetermined initial pattern, or performing an operation on a predetermined initial pattern by a predetermined algorithm, according to the initialization method interpreted by the control circuit.

7. The electric device according to claim 6, wherein the control circuit generates a response indicating a success or failure of the initialization according to the result of the initialization and transmits the generated response.

8. The electric device according to claim 6:
wherein the initialization data generator generates initialization data in which a constant is repeated, according to the initialization method interpreted by the control circuit.

9. The electric device according to claim 6:
wherein the initialization data generator generates initialization data in which a predetermined initial pattern is repeated, according to the initialization method interpreted by the control circuit.

10. The electric device according to claim 6:
wherein the initialization data generator generates initialization data including a value obtained by repeating a plurality of predetermined repetitive patterns, according to the initialization method interpreted by the control circuit.

11. An information processing device comprising:
a memory system including
an interface connected to an electric device, and
a first control circuit that generates an initialization command among a plurality of initialization commands and transmits the generated initialization command to the electric device, the initialization command representing a command instructing the electric device to execute initialization of the main memory and indicating an initialization method among a plurality of initialization methods for the main memory, the initialization method corresponding to a pattern of initialization data, and
the electric device including
a main memory, and
a second control circuit that interprets a received initialization command indicating the initialization method, and initializes the main memory by a pattern among a plurality of patterns indicated by the interpreted initialization command,
wherein the initialization command generated by the first control circuit indicates the initialization method using initialization data including a value obtained by any one of incrementing a predetermined initial pattern, adding a predetermined addition value to a predetermined initial pattern, shifting a value in a predetermined initial pattern, or performing an operation on a predetermined initial pattern by a predetermined algorithm.

* * * * *